(12) United States Patent
Cline et al.

(10) Patent No.: US 8,856,913 B2
(45) Date of Patent: Oct. 7, 2014

(54) METHOD AND PROTECTION SYSTEM FOR MITIGATING SLOW HTTP ATTACKS USING RATE AND TIME MONITORING

(75) Inventors: Kevin Russell Cline, Ann Arbor, MI (US); Chester Kustarz, Ann Arbor, MI (US); Christopher R. Hand, Run Dundee, MI (US); Lawrence Bruce Huston, III, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 237 days.

(21) Appl. No.: 13/355,734

(22) Filed: Jan. 23, 2012

(65) Prior Publication Data

US 2013/0055375 A1 Feb. 28, 2013

Related U.S. Application Data

(60) Provisional application No. 61/528,661, filed on Aug. 29, 2011.

(51) Int. Cl.
G06F 21/00 (2013.01)
H04L 29/06 (2006.01)

(52) U.S. Cl.
CPC .............. *H04L 63/14* (2013.01); *H04L 63/168* (2013.01)

USPC .................... 726/13; 726/11; 726/22; 726/23

(58) Field of Classification Search
None
See application file for complete search history.

(56) References Cited

U.S. PATENT DOCUMENTS

| 7,788,718 B1* | 8/2010 | Fei et al. .......................... 726/22 |
| 2006/0146816 A1* | 7/2006 | Jain ................................ 370/389 |
| 2007/0022474 A1* | 1/2007 | Rowett et al. .................... 726/11 |
| 2007/0022479 A1* | 1/2007 | Sikdar et al. .................... 726/22 |
| 2008/0052774 A1* | 2/2008 | Chesla et al. ................... 726/13 |
| 2008/0295175 A1* | 11/2008 | Ansari et al. ................... 726/23 |
| 2010/0199345 A1* | 8/2010 | Nadir .............................. 726/11 |

* cited by examiner

*Primary Examiner* — Jung Kim
*Assistant Examiner* — Adrian Stoica
(74) *Attorney, Agent, or Firm* — Edwards Wildman Palmer LLP; Scott D. Wofsy; Christopher J. Capelli

(57) ABSTRACT

A system and methods for mitigation slow HTTP, SSL/HTTPS, SMTP, and/or SIP attacks. A protection system monitors each TCP connection between a client and a server. The protection system monitors the header request time and minimum transfer rate for each client and TCP connection. If the client has not completed the data transfer in the minimum time or the data are not transferred at the minimum transfer rate, the protection system determines the connections are potentially a slow attack and resets the connections for the protected devices.

15 Claims, 6 Drawing Sheets

METHOD AND PROTECTION SYSTEM FOR MITIGATING SLOW HTTP ATTACKS USING RATE AND TIME MONITORING

RELATED APPLICATIONS

This application claims the benefit under 35 USC 119(e) of U.S. Provisional Application No. 61/528,661, filed on Aug. 29, 2011, which is incorporated herein by reference in its entirety.

BACKGROUND OF THE INVENTION

The Internet is a global public network of interconnected computer networks that utilize a common standard set of communication and configuration protocols. The Internet includes numerous private, public, business, academic, and government networks. Within each of the different networks are devices such as servers, workstations, printers, portable computing devices, host computers, monitoring devices, to name a few examples. These devices are able to connect to devices within their own network or to other devices within different networks through communication devices such as hubs, switches, and routers, for example.

Sometimes attackers will attempt to disrupt network communications. One example of how attackers will disrupt network communications is termed a Slow HTTP (hyper text transfer protocol) attack. With a slow HTTP attack, an attacker opens many connections with typically a website and specifically an HTTP or web server by sending HTTP requests at a slow rate. Because of the slow transfer rate, it can take minutes or hours to detect an attacker that is sending invalid requests. And, after the invalid requests are detected and the web server resets the connection, the attacker will only continue to open new connections. Since a web server is typically limited to a finite number of simultaneous connections, legitimate clients may not be able to access the website during the attack.

There are several variants of the attack. Some variants, such as the Slowloris program, send GET requests with an indefinite number of request headers. Other variants send POST requests with a complete set of request headers, but include message body of indefinite length that is sent a few bytes at a time.

There are several different techniques website administrators have used to mitigate slow HTTP attacks. The first technique is to modify the web server's configuration. For example, a website administrator can often increase the maximum number of clients that are able to connect simultaneously. Another approach is to decrease the maximum time that a web server will wait for a request to be transmitted. These solutions, however, do not solve the problem. Allowing more clients to connect does not provide a comprehensive solution because the attacker can easily increase the number of simultaneous connections. Likewise, decreasing the maximum time that a web server waits for a request is not a solution because as soon as web server resets the connection, the attacker can immediately open a new connection to the web server.

A second technique is to use the iptables command to limit the number of connections per internet protocol (IP) address. The iptables command on a Linux server can be used to limit the number of new connections per minute from a single IP address. However, this technique may block legitimate clients who make many connections serially, such as a client retrieving many different files in succession. The iptables command also blocks legitimate clients that access the website through a proxy server, since all the requests originate from the same proxy IP address. Furthermore, this technique does not work with all kernel builds of the Linux operating system.

A third technique is to install a load balancer with delayed binding. This approach is able to mitigate some types of slow HTTP attacks. However, load balancers often fail to mitigate attacks that send a POST request message body at a very slow rate. This is because the load balancer establishes a connection with the web server, which remains open as long as the message body is transmitted, once all the request headers are transmitted.

A fourth technique is to add a special purpose module to the web server application. There are some add-on modules, such as mod_antiloris for the Apache server, that are able to mitigate slow HTTP attacks. These modules, however, only work with specific web servers. Furthermore, these modules often have additional shortcomings. For example, the mod_antiloris module prevents a single IP address from forming a large number of simultaneous connections with the web server and thus blocks legitimate clients connecting via a proxy server.

SUMMARY OF THE INVENTION

Unfortunately, none of the above-discussed techniques is able to protect against different variants of a slow HTTP attack and/or isolate the servers from the attack.

The solution here is to use application-specific knowledge to determine when legitimate devices should be sending data, when the connection should be idle, and recognize behaviors that are indicative of a slow HTTP attack. This knowledge is embodied in a protection device that monitors the individual requests from clients to the server, for example a web server. When the clients send the first packet of an HTTP request, a start time is saved. The protection device then periodically checks the connection to see if the clients have completed the transfer of the request header in an expected length of time. If the transfer is not complete within the expected time, the protection device determines the client is or may be an attacker and preventive measures are applied.

In general, according to one aspect, the invention features a method for handling connections to protected devices. The method comprises determining whether connections generated by external devices accessing the protected devices are suspect connections potentially indicative of a slow attack and for the suspect connections from the external devices, sending reset packets to the protected devices for the suspect connections.

In embodiments, the connections are determined to be suspect connections by monitoring bit rates of the individual requests from the clients. A reset packet is then sent when the bit rate of an individual request fall below a minimum connection bit rate. Examples of suspect connections include POST requests. Further, the connections can be determined to be suspect connections by monitoring header times of the connections.

In other aspects of the embodiments, the number of suspect connections that are received from the external devices over time are monitored and the external devices are added to a blacklist of devices when the number of suspect connections exceeds a suspect connections threshold. Packets from external devices attempting to access to the protected devices are dropped when blacklisted.

In general according to another aspect, the invention can also be characterized in terms of a system. This system comprises a protected network in which the protected devices are located and a protection device located in-line on a link connecting the protected network to a public network, the protection device determining whether connections generated by external devices from the public network attempting to access the protected devices are suspect connections potentially indicative of a slow attack. When it determines that the connections are suspect, reset packets are sent to the protected devices for the suspect connections.

In general according to still another aspect, the invention features a protection system that monitors the temporal lengths of header phases of connections from the external devices that are establishing connections to the protected devices. It will then reset the connections for the protected devices that have been in the header phases for longer than a maximum request header time.

In general according to still another aspect, the invention features a protection device that monitors the transfer bit rate of connections from external devices connected to protected devices within the protected network, and resets the connections for the protected devices if the transfer bit rate is slower than a minimum request bit rate.

In general, according to another aspect, the invention features a protection system for handling requests to protected devices. The protection system including a protected network in which the protected devices are located and a protection device located in-line on a link connecting the protected network to a public network. The protection device determines whether requests generated by external devices from the public network attempting to access the protected devices are suspect requests potentially indicative of a slow HTTP attack and for the suspect requests from the external devices and sending reset packets to the protected devices for the suspect requests.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
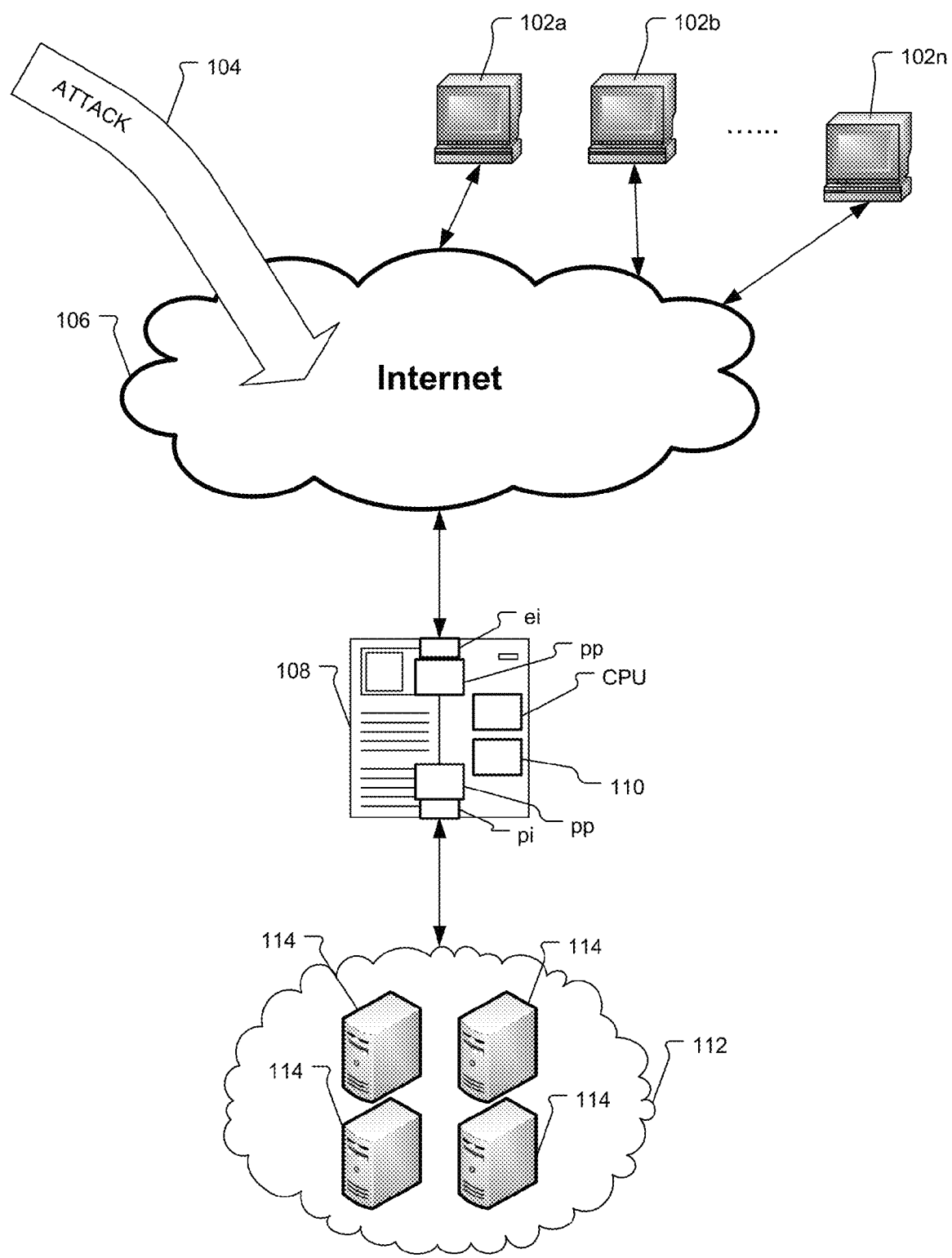
FIG. 1 is a schematic diagram illustrating the relationship between the protected network, protection device, Internet, and external devices, according to the present invention

FIG. 1 is a block diagram illustrating the relationship between a protection system for protecting a private network 112, the Internet 106, client devices 102*a* to 102*n*, and a slow HTTP attack 104.

In a typical implementation, the external client devices (or clients) 102*a*, 102*b* . . . 102*n* attempt to connect to protected devices 114 within a protected network 112 via a private network or a public computer network such as the Internet 106. In the illustrated example, the protected devices are HTTP or web servers. In other examples, the servers 114 implement one or more of the following protocols: HTTP, SSL/HTTPS, SMTP, and/or SIP. Examples of client devices include servers, laptops, desktop computers, tablet devices, mobile phones, mobile computing devices, video games systems, and televisions with Internet connectivity, to list a few examples.

The protection system includes a protection device 108 located in-line, i.e., between the Internet 106 and the protected network 112. Usually, the protected network 112 is an enterprise network, such as a school network, business network, and government network, to list a few examples. Because the protection device 108 is located in-line or on the network connection between the protected network 112 and the internet or service provider network, it is able to protect the web servers 114 by monitoring traffic between the servers 114 and the client devices 102.

In another embodiment, the protection device 108 is located within the protected network 112 or even on a link within a service provider network. When deployed within the protected network 112, all incoming network traffic or at least new connections or connection requests are diverted to the protection device 108. In this embodiment, the protection device 108 only protects specific devices or part of the network.

In one example, the protection device 108 comprises a packet processing system with an external high speed network interface ei and a protected high-speed network interface pi. Under current technology, these interfaces are capable of handling 1.5-40 Gbps, for example. The protection device 108 may further include packet processors pp that process the packets received at the interfaces ei, pi. A central processing unit (CPU) and a data storage medium 110 are all connected through buses and are used to further support the processing of the received packets. Additionally, computer code is stored in the storage medium and executed by the CPU and packet processors.

The protection device 108 preferably analyzes all incoming network traffic from client devices 102*a* to 102*n*. In a typical implementation, the protection device 108 is configured with a minimum request transfer rate (or bit rate), which is measured in bits per second (or bps), and a maximum request header time. Any HTTP request that takes longer than the maximum request header time to transmit the request header is determined to be a suspect request caused by a slow HTTP attack. Likewise, any HTTP request that is transmitted at a transfer rate lower than the minimum request transfer rate is also determined to be a suspect request caused by a slow HTTP attack.

Additionally, the protection device 108 also checks for malformed packets and monitors other factors such as packet size and data contents to ensure that the incoming packets are not artificially short. In a typical implementation, the protection device 108 determines whether the packet is artificially short if the incoming packet is less than 500 bytes, is part of the request header, is not the last packet in a request header, and does not end in a "\n" (end line) character. When all of these conditions are met, the protection device 108 determines that a client is artificially breaking packets into smaller pieces to be intentionally inefficient.

Likewise, when the behaviors are detected from the same client and for consecutive connection requests, the protection system 108 determines that the client is attempting to execute a slow HTTP attack and the connection issues are not because of transient network problems.

In a typical implementation, when a suspect request caused by the slow HTTP attack is detected, the protection device 108 sends a reset packet (or RST) to the web server that forces the client to reconnect. The protection system records the number of consecutive times the same client is reset due a slow HTTP attack being detected. If multiple consecutive connections from the same client exceed a predefined suspect request threshold and are determined to be further slow HTTP attacks, the client's IP address is blacklisted and stored to a table in the data storage medium 110.

The suspect request threshold is a user defined value typically configured by the website administrator. The suspect request threshold limits the number of times a client is able to reconnect to the web server after the connection is reset due to the protection system 108 detecting a slow HTTP attack. When the protection device 108 device blacklists a client's IP address, it will not forward any more packets to the protected network 112. Likewise, and new connection attempts from the blacklisted client device results in the packets being dropped by the protection system 108. This prevents the attacker from opening new connections to any other protected devices 114 within the protected network.

A legitimate client may occasionally transmit data at a slow transfer rate because of transient problems in the Internet. The protection device 108 is designed to be forgiving to these occasional problems. Therefore, it is only after multiple consecutive connections have been reset by the web server that a client is blacklisted, in the current embodiment. Additionally, the protection device 108 does not automatically reset a connection or blacklist a client if there are multiple connections and/or requests originating from a proxy. Generally, the protection device does not determine if a client is an attacker based on the number of connections originating from a single IP address. Rather, the protection device 108 determines if a client is an attacker based on the behavior of the individual connection requests.

Additionally, the protection system 108 monitors all layers of the protocol stack. The Open Systems Interconnection (or OSI) model is a way of dividing communications systems into smaller parts called layers. There are seven layers with similar communication functions grouped together in the layers. Each layer provides service to an upper layer, while receiving services from the layer below. By examining OSI layer-7 information, which includes HTTP, the protection device 108 is able to detect when the client is sending a HTTP request. Moreover, the protection device 108 is able to correlate connection information across the different layers.

The protection device 108 continually monitors the connections for behaviors indicative of an attack at the lower layers of the protocol stack. For example, legitimate clients typically buffer their requests to ensure better network throughput. Similarly, legitimate clients typically do not break up the HTTP requests into multiple packets and include multiple delays. Generally, splitting up packets and including delays are behaviors indicative of a slow HTTP attack. By associating packet size to the request phase, it is possible to identify slow HTTP bots (aka internet bots) with few false positives. Additionally, the protection system is able to monitor all connections to identify the unwanted behaviors across multiple connections to further reduce false positives.

Figure 2:
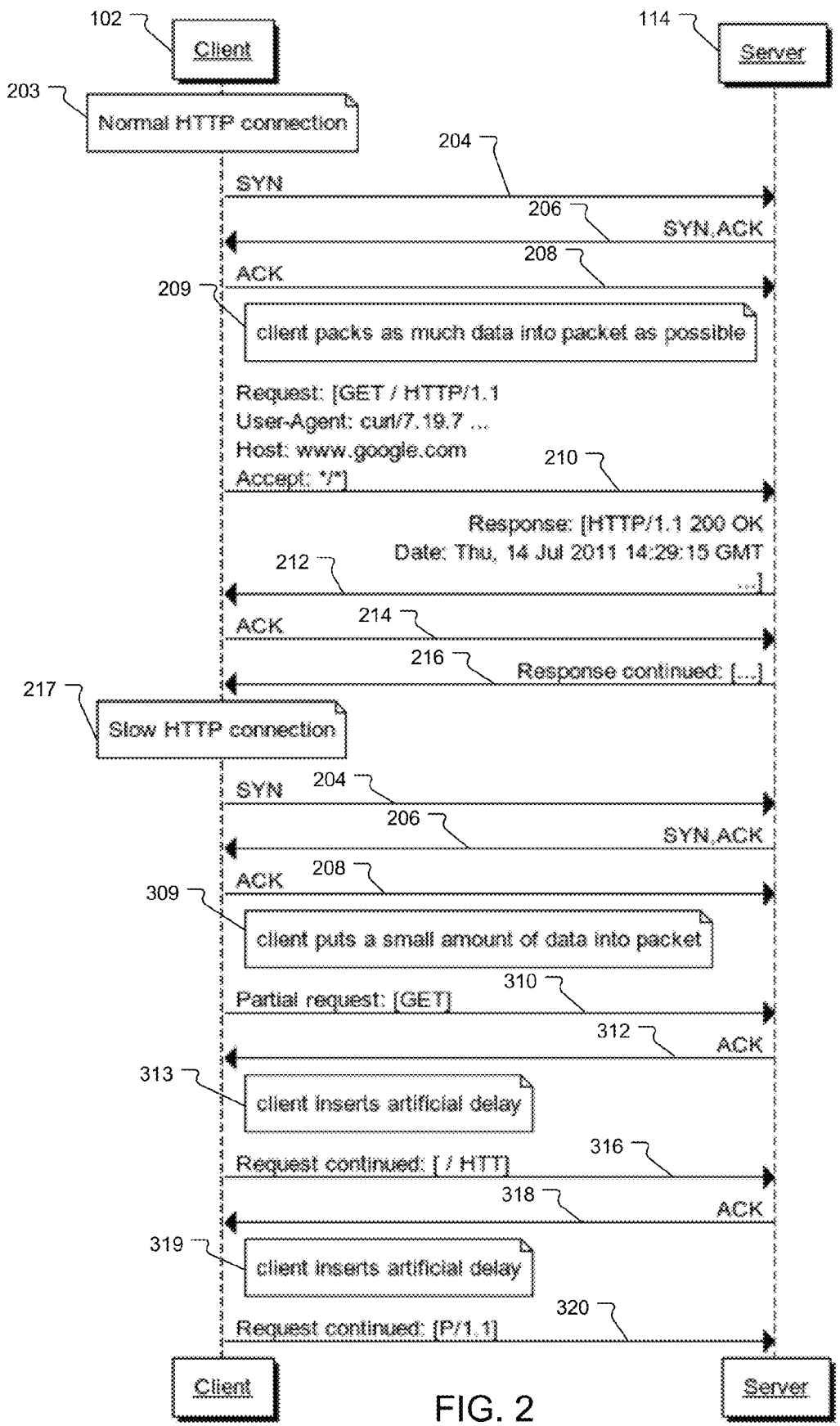
FIG. 2 is a timing diagram illustrating the sequence for a typical HTTP connection between a client and a web server and illustrating the sequence for a slow HTTP attack targeting a web server.

FIG. 2 illustrates the sequence of communications for a typical HTTP connection between a client 102 and a web server 114 and the sequence for a slow HTTP attack targeting a web server.

For a normal HTTP connection 203, the client 102 establishes a connection to the server 114 using the transmission control protocol (TCP) "3-way handshake:" SYN, SYN-ACK, ACK. The client 102 sends a TCP synchronize (SYN) 204 to the server 114. The server 114 receives the client's SYN packet and sends a SYN-ACK (synchronize-acknowledge) 206 to the client 102. The client 102 receives the server's SYN-ACK and sends an ACK 208 to the server 114. The server 114 receives the ACK and the TCP socket connection is established.

Once the TCP connection is established, the client 102 sends a HTTP request 210 to the server 114. Generally, the client packs as much data into the packet as possible 209 because this is the fastest and most efficient method to transfer information from one device to another.

HTTP defines nine methods (sometimes referred to as 'verbs') including HEAD, GET, and POST.

The request, in the form of a text record that a user's browser sends to a web server, contains the details of what the browser wants and will accept back from the server. The request header also contains the type, version and capabilities of the browser that is making the request so that server returns compatible data.

Upon receipt of the request header, the server 114 will return an HTTP response 212 to the client that is attached to the file(s) sent to the client 102. The client 102 sends an ACK 214, which signals the reception of requested data and/or files. The server 114 may need to send additional data in a continued response 216. Once the transfer is complete, the client 102 is then able request more data from the server using the already existing connection.

A slow HTTP connection 217 exploits the transfer protocol to indefinitely keep a connection open. The client 102 first establishes a connection with the server 114 using the TCP "3-way handshake" and follows the SYN 204, SYN-ACK 206, ACK 208 protocols to open the connection.

Next, the attacker might only put a small amount of data into the packet 309. Often, the client 102 uses a "partial GET" request 310. In a "partial GET" request, only part of the data to be transferred is in the request. The partial GET method is designed to reduce unnecessary overall network traffic by enabling partially-sent data to be completed without re-transferring all of the data to the client. The server 114 sends an ACK 312 to acknowledge the partial GET request. The client 102 then inserts an artificial delay 313 to further extend the length of time the server 114 has to wait. The client 102 then sends another small piece of data to continue the request 316 and keep the connection open, waits for the server 114 ACK 318, and inserts an artificial delay 319. The client then send another small piece of data to continue the request 320 and keep the connection open.

The process of sending small pieces of data with unnecessary delays continues until, in a conventional system, the server determines the request is invalid or the connection times-out and the server resets the connection. If the connection is reset, the client opens a new connection and begins the process again.

Figure 3:
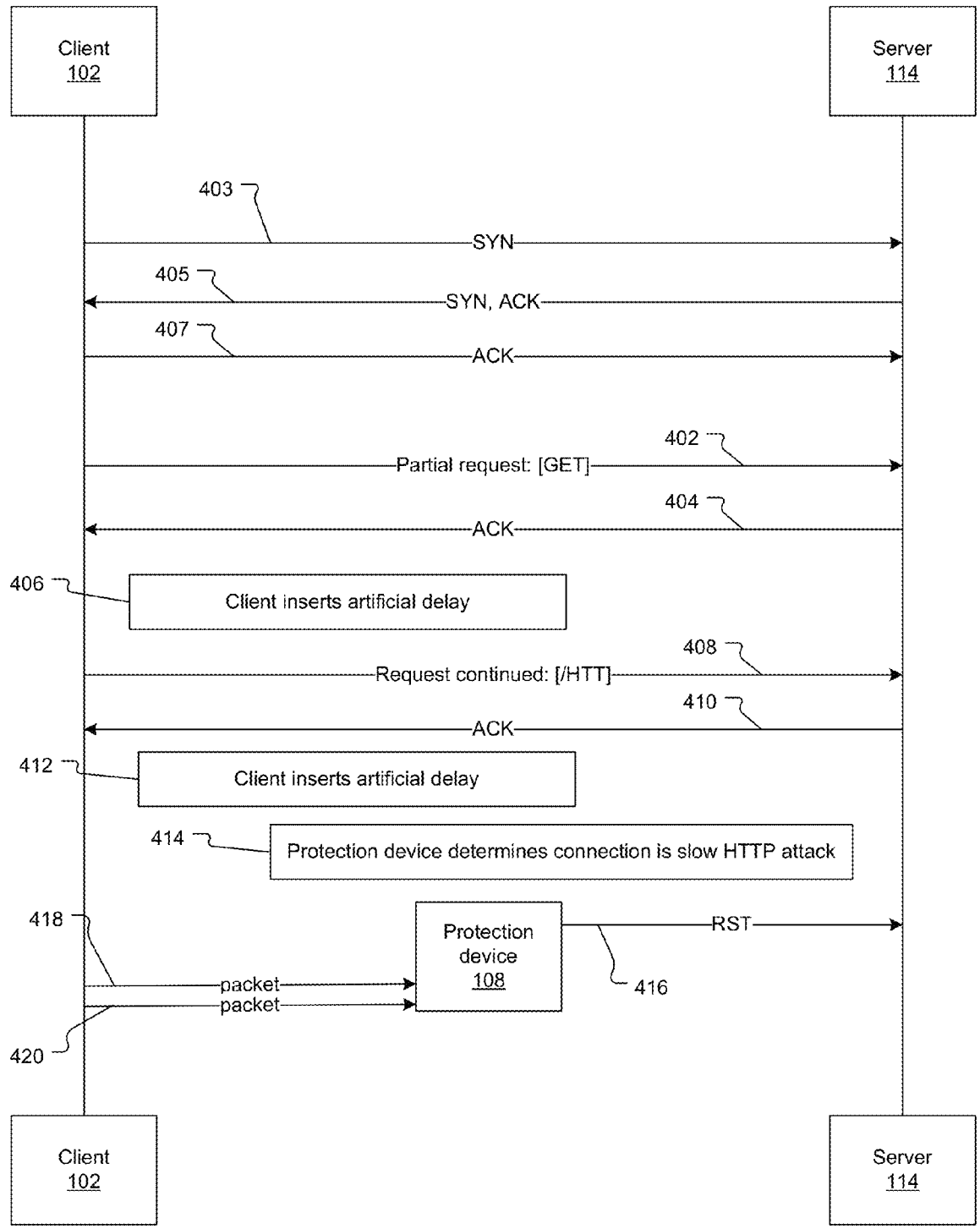
FIG. 3 is a timing diagram illustrating the protection system resetting a connection and dropping packets of a blacklisted client.

FIG. 3 is a timing diagram illustrating how the protection system 108 resets the connection and will also drop any incoming packets from a blacklisted client after multiple consecutive requests from a client have been determined to be part of a slow HTTP attack.

The client 102 establishes a new connection to the server 114 using the TCP "3-way handshake" (SYN 403, SYN-ACK 405, ACK 407). Once the connection is established, the client 102 sends a partial GET request 402. The server sends an ACK 404. The client inserts an artificial delay 406 and the partial request is continued 408. The server 114 responds with an ACK 410. The client then 102 inserts another artificial delay 412. During a slow HTTP, the attack attempts to keep this cycle of sending a small piece of data followed by an artificial delay as long as possible.

The in-line protection device 108 transmits these packets between the client 102 and the server 104. Nevertheless, since it is in-line, it is able to monitor the connections and packet transmissions. Based on the artificial delays and intentionally small packet sizes from the client 102, the protection device 108 concludes that the connection could be part of a slow HTTP attack 414. The protection device 108 responds by sending a RST (reset) packet 416 to the server with a source address of the client 102 to reset the connection. Additionally, if the connection has been reset multiple consecutive times and that exceeds the suspect connection threshold, then the protection device 108 blacklists the client's IP address and any future packets 418, 420 from the blacklisted IP address are dropped by the protection device 108. This prevents the client from establishing any new connections to any protected devices within the protected network 112.

In the illustrated example, the protection device 108 detects the slow HTTP attack after two partial GET requests and two artificial delays. In a typical implementation, however, it takes more than two partial GET request or artificial delays to cause the protection device 108 to intervene.

In the illustrated example, the slow HTTP attack is utilizing partial GET requests and artificial delays to keep the connection open and consume resources for as long as possible. In an alternative attack, the slow HTTP attack uses POST requests for a similar purpose. The attacker would establish the connection with the server, but would transfer the POST data at a slow rate to again keep the connection open as long as possible. In still another example, the slow HTTP attack keeps the connection open by prolonging the HEAD request phase. In each of these alternative scenarios, the protection device 108 detects the slow transfer rates and delays and intervenes by sending a reset to the server on behalf of the slow client 102.

Figure 4:
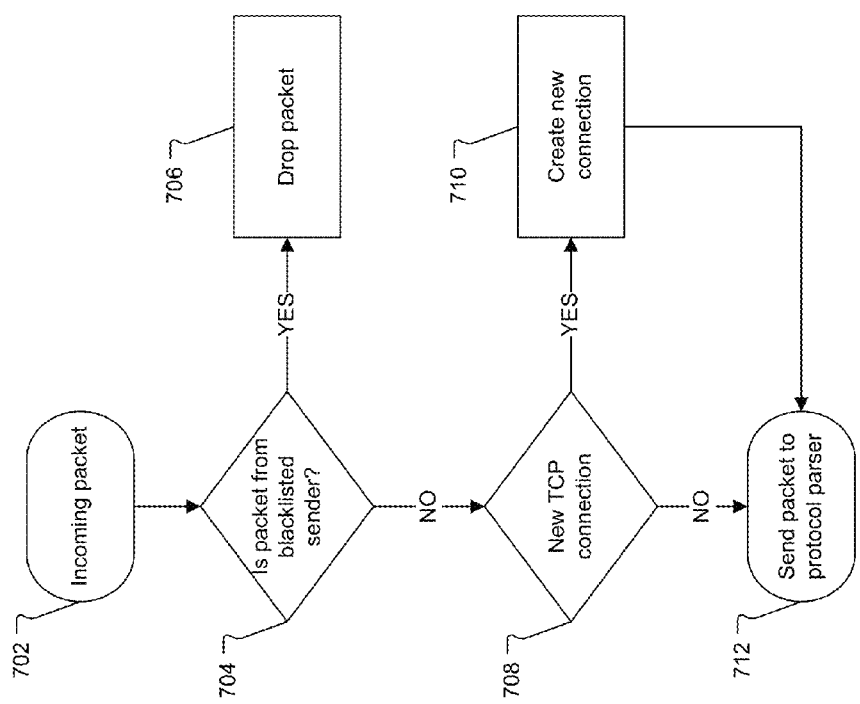
FIG. 4 is a block diagram that illustrates the steps performed by the protection device for incoming packets.

FIG. 4 is a block diagram that illustrates the steps performed by the protection device 108 for incoming packets.

In the first step 702, an incoming packet arrives. In the next step 704, the protection device 108 determines if the packet is from a blacklisted sender. Typically, the determination is performed by comparing the IP address of the incoming packet against a list of blacklisted IP addresses stored in the storage medium of the protection device 108.

If the packet is from a blacklisted sender, then the protection device 108 drops the packet in step 706. If the packet is not from a blacklisted sender, then the protection device 108 determines if the incoming packet is new TCP connection in step 708. If the packet is not a new TCP connection, then the packet is sent to the protocol parser in step 712. If the packet is a new connection, then the protection system 108 creates a new connection in step 710. In the next step 712, the packet is sent to the protocol parser.

Figure 5:
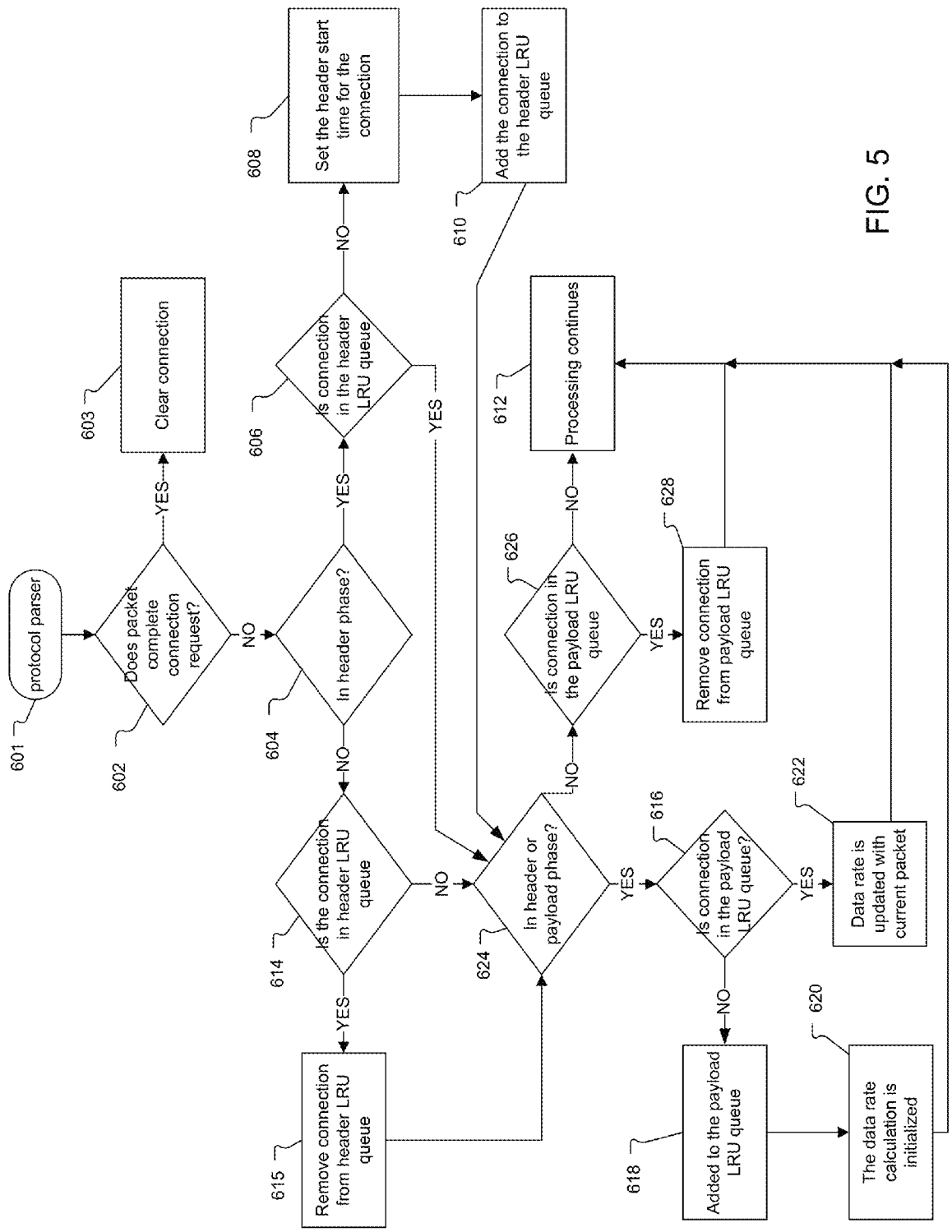
FIG. 5 is a flow chart showing the steps performed to track information about the protocols running on the TCP connection and to track data transfer for the detection of slow HTTP attacks.

FIG. 5 is a flow chart showing the steps performed by the protocol parcer of the protection system 108 to track information about the protocols running on the TCP connection and to track the behavior of those connections.

The protection device 108 uses queues stored in the memory 110 to store state information about each connection between each client 102 and the server 114. The protection device 108 utilizes two least recently used queues (LRU) for detecting slow connections. LRU queues discard the least recently used items first. This requires monitoring what information was accessed and when it was accessed. By continuously monitoring the connections, the protection device is able to determine when clients are part of a slow HTTP attack.

The first LRU queue is the header LRU queue. This LRU queue is used to track connections that are currently in the header phase of the transmission protocol. By recording when a connection was created, the header queue is able to measure maximum header time. If a pending connection has been in the queue longer than the maximum header time, then the protection device 108 determines the client is an attacker or at least may be an attacker.

The second LRU queue is the payload LRU queue. This payload queue is used to track connections during all phases of the transmission protocol. The payload queue records the minimum transfer rate. The minimum transfer rate is the minimum rate the client must maintain. If a client sends packets below the minimum transfer rate, then the protection device 108 determines the client is an attacker.

The transfer rate is typically monitored with an inverse token bucket. An inverse token bucker is an algorithm that ensures minimum amount of data are being transmitted by an entity (or entities). Tokens are removed from the bucket at the minimum transfer rate. In a preferred embodiment, token are removed at a rate of one per second. More tokens are added to the bucket as the client transmits more data. As long as there are tokens in the bucket, the client is transmitting data above the specified rate. If the bucket ever empties (no tokens in the bucket) the protection device 108 determines that the client is an attacker or at least may be an attacker because the client is not transmitting data above the minimum transfer rate. Varying the rate that the tokens are removed the bucket will change the minimum transfer rate.

In the first step 601, a packet arrives at the protocol parser. In the next step 602, the protection system 108 determines if the packet completes the connection request. If the packet completes the connection request, then the protection system 108 clears the connection in step 603. If the packet does not complete the connection request, then the protection system 108 determines if the connection is in the header phase in step 604.

If the connection is in the header phase, then the protection system 108 determines if the connection is in the header LRU queue in step 606. If the connection is not in the header LRU queue, then the protection system 108 sets the header start time for the connection in step 608 and adds the connection to the header LRU queue in step 610. The header start time is recorded to enable to the protection system 108 to calculate how long a connection has been in the header phase.

If the connection is not in the header phase (step 604), then the protection device 108 determines if the connection is in the header LRU queue in step 614. If the connection is in the header LRU queue, then the protection system 108 removes the connection from the header LRU queue in step 615 since the client has advanced out of this connection state as would be expected by a normally functioning client.

Step 624 is performed in a number of scenarios: after the connection is removed from the LRU queue (step 615), if the connection is not in the header LRU queue (step 614), if the connection is in the header LRU queue (step 606), or after the connection is added to the header LRU queue (step 610). This is because data rates are monitored for all connection requests that are in the request phase. Step 624 determines if the connection is in the header or payload phase, or more generally the request phase.

If the connection is not in the header or payload phase as determined in step 624, then the protection system 108 determines if the connection is in the payload LRU queue in step 626. If the connection is not in the header phase or payload phase, then there are no connection requests being processed. If the connection is not in the payload LRU queue, then the protection system 108 continues processing in step 612. If the connection is in the payload LRU queue, then the protection system removes the connection from the payload LRU queue in step 628. In the next step 612, the protection system 108 continues processing packets.

If the connection is in the header or payload phase as determined in step 624, then the protection system determines if the connection is in the payload LRU queue in step 616. If the connection is not in the payload LRU queue, then connection is added to the payload LRU queue in step 618. In the next step 620, the data rate calculation is initialized. The rate calculation is a calculation of the transfer rate of data for that client 102. The transfer rate measures the rate the data are transferred from the client to the web server. In the next step 612, the protection system continues processing packets. If the connection is in the payload LRU queue (step 616), then the data rate is updated in step 622. In the next step 612, the protection system continues processing packets.

In another aspect, the protection device 108 monitors a number of suspect connections or requests for connections that are received from the clients simultaneously and adds the clients' IP addresses to a blacklist of devices when the number of suspect connections or requests from any single client exceeds a threshold.

While monitoring the minimum transfer rate is described in terms of HTTP connections, in other embodiments, transfer rates of one of more of the following protocols is monitored: HTTP, SSL/HTTPS, SMTP, and/or SIP.

Figure 6:
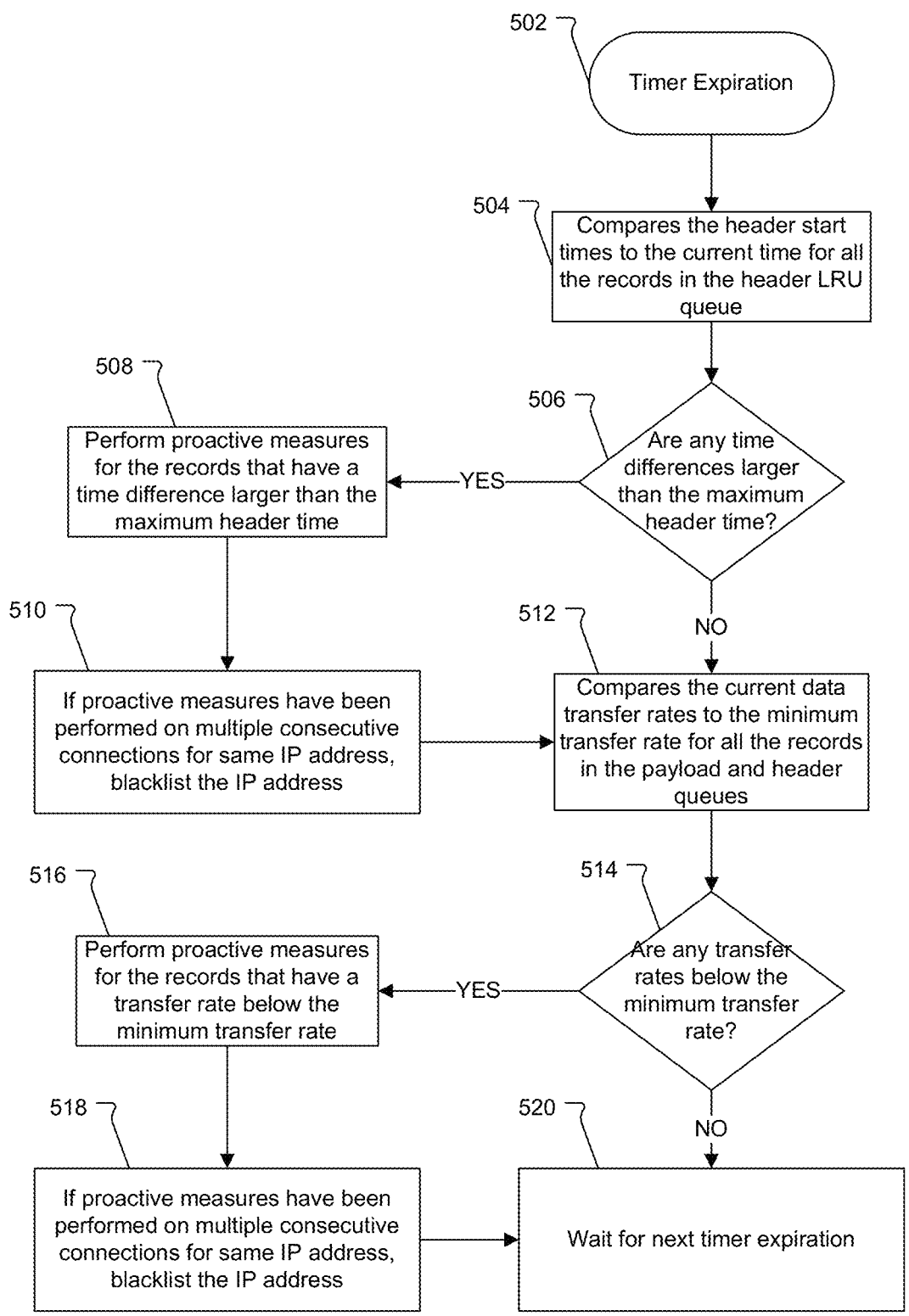
FIG. 6 is a flow chart illustrating the steps performed by the protection device during the monitoring of the individual requests.

FIG. 6 is a flow chart illustrating the steps performed by the protection device during the periodic monitoring to check for idle connections.

The periodic monitoring is an independent task that checks for idle and/or intentionally slow connections. The periodic monitoring of the protection system 108 checks the status of all the individual requests in the header and payload LRU queues to ensure that individual requests have not fallen below the minimum transfer rate threshold or exceeded the maximum header connection length threshold.

In the first step 502, the protection device 108 initiates the periodic monitoring after expiration of the timer. In the next step 504, the protection device 108 compares the header start times to the current time for all the records in the header LRU queue. In the next step 506, the protection device 108 determines if any of the connections in the header LRU queue have time differences larger than the maximum header time. This is done by comparing the current system time to the header start time that was recorded when the connection was added to the queue.

If any of the maximum header times of any of the connections are greater than the predetermined threshold, then the protection device 108 performs proactive measures on these slow connections in step 508. Generally, the proactive measures include the resetting of these slow connections between external devices 102 and server 114 by sending reset packets to the server with the IP source addresses of the external devices that originated these slow connections. In the next step 510, if proactive measures have been performed on multiple consecutive connections from the same external devices/source addresses, then the IP addresses associated slow connections are added to the list of blacklisted devices.

If none of the records in the queue is greater than the maximum header time or the proactive measures have been performed, then the protection device 108 compares the current data transfer rates of the connections to the minimum transfer rate for all the records in the payload and header queues in step 512.

In the next step 514, the protection device 108 determines if the transfer rates of any of the records in the header or payload LRU queues are below the minimum transfer rate. Generally, this is done by comparing the data rate of the records to a predefined minimum threshold level.

If any of the records in the queue are below the minimum threshold, then the protection device 108 performs proactive measures to these connections in step 516. As described before, in the current embodiment, the proactive measures include the resetting of these slow transfer rate connections between external devices 102 and server 114 by sending reset packets to the server with the IP source addresses of the external devices that originated these slow transfer rate connections. In the next step 518, if proactive measures have been performed on multiple consecutive connections from the same external devices/source addresses, then the IP addresses associated slow connections are added to the list of blacklisted devices.

If none of the records in the queue is below the minimum transfer rate or the proactive measures have been performed, then the protection device 108 ends the periodic check and waits for the next timer expiration in step 520.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for handling connection to protected devices based on application specific knowledge for determining whether connections generated by external devices accessing protected devices are suspect connections indicative of a slow attack, the method comprising:
    monitoring a communication to determine a bit-rate between an external device and a protected device for a connection;
    determining when a said external device should be sending data to said protected devices and when said external device should be idle premised upon an application fostering said communication;
    determining a minimum bit-rate from said external device to said protected device when said external device is determined to be sending data to said protected device; and
    performing one or more preventive actions when said monitored bit-rate is less than said determined minimum bit-rate when said external device is determined to be sending data to said protected device to prevent occurrence of a said slow attack.

2. The method according to claim 1, wherein the suspect connections are POST requests.

3. The method according to claim 1, wherein the connections are determined to be suspect connections by monitoring header times of the connections, and the method further comprises sending the reset packets when the header times are above a maximum request header time.

4. The method according to claim 3, wherein the suspect connections are GET requests.

5. The method according to claim 1, further comprising:
monitoring a number of suspect connections that are received from the external devices over time; and
adding the external devices to a blacklist of devices when the number of suspect connections exceeds a suspect connections threshold.

6. The method according to claim 5, further comprising dropping packets from external devices attempting to access to the protected devices if multiple connection requests from the same external device are determined to be suspect connections.

7. A method according to claim 1, further comprising intercepting the connections from the external devices at an edge of a protected network containing the protected devices.

8. The method according to claim 1, further comprising:
monitoring a number of suspect connections that are received from the external devices simultaneously; and
adding the external devices to a blacklist of devices when the number of suspect requests exceeds a suspect request threshold.

9. A protection system for handling requests to protected devices based on application specific knowledge for determining whether connections generated by external devices accessing protected devices are suspect connections indicative of a slow attack, the protection system comprising:
a protected network in which the protected devices are located; and
a protection device located in-line on a link connecting the protected network to a public network, the protection device determining whether connections generated by external devices from the public network attempting to access the protected devices are suspect connections potentially indicative of a slow attack and for the suspect connections from the external devices, sending reset packets to the protected devices for the suspect connections wherein the connections are determined to be suspect connections by:
monitoring a communication to determine a bit-rate between an external device and a protected device for a connection;
determining when a said external device should be sending data to said protected devices and when said external device should be idle premised upon an application fostering said communication;
determining a minimum bit-rate from said external device to said protected device when said external device is determined to be sending data to said protected device; and
performing one or more preventive actions when said monitored bit-rate is less than said determined minimum bit-rate when said external device is determined to be sending data to said protected device to prevent occurrence of a said slow attack.

10. The system according to claim 9, wherein the suspect connections are POST requests.

11. The system according to claim 9, wherein the protection device determines that connections are suspect connections by monitoring header times of the connections, and the protection devices sends the reset packets when the header times for the suspect connections are above a maximum request header time.

12. The system according to claim 11, wherein the suspect connections are GET requests.

13. The system according to claim 9, wherein the protection device further monitors a number of suspect connections that are received from the external devices over time and adds the external devices to a blacklist of devices when the number of suspect connections exceeds a suspect connections threshold.

14. The system according to claim 13, wherein the protection devices further drops packets from external devices attempting to access to the protected devices if multiple connections from the same external device are determined to be suspect connections.

15. The system according to claim 9, wherein the protection devices further monitors a number of suspect connections that are received from the external devices simultaneously and adds the external devices to a blacklist of devices when the number of suspect connections exceeds a threshold.

* * * * *